United States Patent
Yurash et al.

(10) Patent No.: US 12,103,991 B2
(45) Date of Patent: Oct. 1, 2024

(54) ELECTROCHEMICAL CURING OF REDOX-ACTIVE SEALANTS AND ADHESIVES

(71) Applicant: The Boeing Company, Chicago, IL (US)

(72) Inventors: Brett Yurash, Venice, CA (US); Andrew Nowak, Winnetka, CA (US); Ashley Marie Dustin, Santa Monica, CA (US); Carissa Ann Pajel, Mercer Island, WA (US); Melinda Dae Miller, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 17/712,286

(22) Filed: Apr. 4, 2022

(65) Prior Publication Data
US 2022/0348694 A1    Nov. 3, 2022

Related U.S. Application Data

(60) Provisional application No. 63/180,173, filed on Apr. 27, 2021.

(51) Int. Cl.
*C08F 2/58* (2006.01)
*C08L 81/04* (2006.01)
*C25B 9/00* (2021.01)

(52) U.S. Cl.
CPC .............. *C08F 2/58* (2013.01); *C08L 81/04* (2013.01); *C25B 9/00* (2013.01)

(58) Field of Classification Search
None
See application file for complete search history.

(56) References Cited

U.S. PATENT DOCUMENTS

| | | | |
|---|---|---|---|
| 3,679,534 A | 7/1972 | Weinberg | |
| 4,393,105 A * | 7/1983 | Kreisman | E06B 3/6715 156/99 |
| 6,919,397 B2 | 7/2005 | Proebster et al. | |
| 2008/0310007 A1* | 12/2008 | Agrawal | G02F 1/161 359/275 |
| 2020/0317918 A1 | 10/2020 | Toolis et al. | |

FOREIGN PATENT DOCUMENTS

EP         3072599 A1 *  9/2016  ............. B05B 12/00

OTHER PUBLICATIONS

Olaj, Electrolytically Initiated Vinyl Polymerization, Markomolekulare Chemie, Macromolecular Symposia, vol. 8, No. 1, Mar. 1987, pp. 235-254 (Year: 1987).*
European Search Report for EPO Patent Application No. 22154586. 6, mailed Jul. 11, 2022, 9 pages.
Leite et al., "Electrochemical Oxidation of Thiols to Disulfides", Synthetic Communications, Feb. 1990, pp. 393-397.
(Continued)

Primary Examiner — Harry D Wilkins, III
(74) Attorney, Agent, or Firm — Jordan IP Law, LLC

(57) ABSTRACT

Disclosed herein are methods and apparatuses for curing a polymerizable material capable of cure through a redox reaction by electrically contacting the polymerizable material with an anode and a cathode to create a voltage bias that promotes curing of the polymerizable material.

18 Claims, 6 Drawing Sheets

(56) References Cited

OTHER PUBLICATIONS

Weinberg et al., "Electrochemical Curing of Epoxy Resins", J Appl Electrochem 3, Feb. 28, 1973, pp. 227-230.
Gan et al. "Voltage-Activated Adhesion through Donor-Acceptor Dendrimers", Macromolecules, 2018, pp. 6661-6672.
Gan et al. "Self Curing and Voltage Activated Catechol Adhesives", Chem. Commun., 2019, pp. 10076-10079.
Hou et al. "Improved Interfacial Electronic Contacts Powering High Sulfer Utilization in All-Solid-State Lithium-Sulfer Batteries", Energy Storage Materials, 2020, pp. 436-442.
Zhou et al., "The Investigation on the Curing Proces of Polysulfide Dealant by 'in situ' Dielectric Analysis", Journal of Applied Polymer Science, Jan. 12, 2012, pp. 1725-1732.

\* cited by examiner

ELECTROCHEMICAL CURING OF REDOX-ACTIVE SEALANTS AND ADHESIVES

CROSS-REFERENCE TO RELATED APPLICATIONS

This U.S. Non-provisional patent application claims the benefit of priority to U.S. Provisional Patent Application No. 63/180,173 filed Apr. 27, 2021.

FIELD

The disclosure relates to electrochemical curing of redox-active polymerizable materials.

BACKGROUND

Sealants play a vital role in the successful assembly of many industrial articles including various aircraft components where sealants see widespread use in both manufacturing and maintenance. Various compounds are used as sealants to achieve seals at conjoined substrate surfaces. Surfaces requiring sealants can exist in the interior of the aircraft and include, for example, areas within an aircraft or spacecraft wing. These parts include fasteners on the interior of fuel tanks. Typical sealant applications on an aircraft involves solvent cleaning of the area and then sequential application of sealant, in most cases as a stack-up of various classes of sealants. The curing of sealant can be a lengthy process (up to 24 h) that slows aircraft production and maintenance efficiency.

There is a need in the art for a process that is more efficient than the lengthy process that is currently used in the industry.

SUMMARY

In accordance with one or more examples, provided are apparatuses for electrochemical curing of a polymerizable material comprising: (a) a polymerizable material capable of cure through a redox reaction, (b) at least one cathode; and (c) at least one anode; wherein the at least one cathode and the at least one anode are positioned to be in electrical contact with the polymerizable material and the at least one cathode and the at least one anode are capable of forming a voltage bias within the polymerizable material that promotes curing of the polymerizable material; and wherein the anode and cathode electrically contact the polymerizable material without physically contacting each other.

Disclosed are methods of curing a polymerizable material capable of cure through a redox reaction, the method comprising electrically contacting the polymerizable material with at least one anode and at least one cathode that create a voltage bias that promotes curing of the polymerizable material.

Also disclosed are robotic apparatuses employing the methods and/or apparatuses disclosed herein.

The features, functions, and advantages that have been discussed can be achieved independently in various examples or can be combined in yet other examples further details of which can be seen with reference to the following description and drawings.

DRAWINGS

The various advantages of the examples of the present disclosure will become apparent to one skilled in the art by reading the following specification and appended claims, and by referencing the following drawings in which:

Figure 4A:
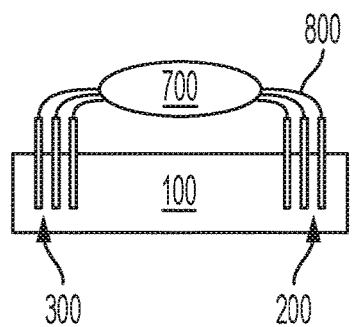
Figure 4B:
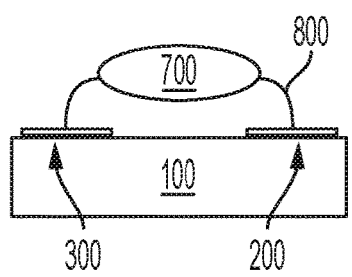
Figure 4C:
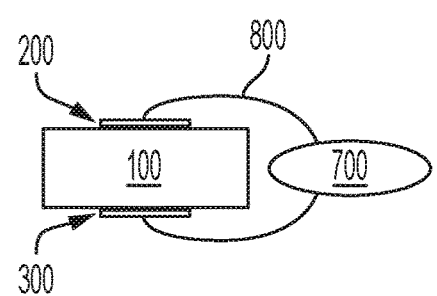

FIGS. 4A-4C present schematics of examples of various electrode geometries and configurations: (FIG. 4A) cathode(s) and anode(s) within the polymerizable material; (FIG. 4B) cathode(s) and anode(s) separated on one surface of the polymerizable material; and (FIG. 4C) cathode(s) and anode(s) positioned on different surfaces of the polymerizable material.

Figure 5A:
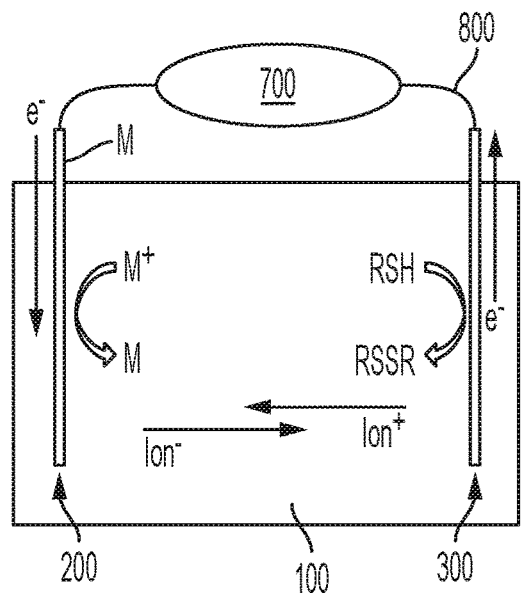
Figure 5B:
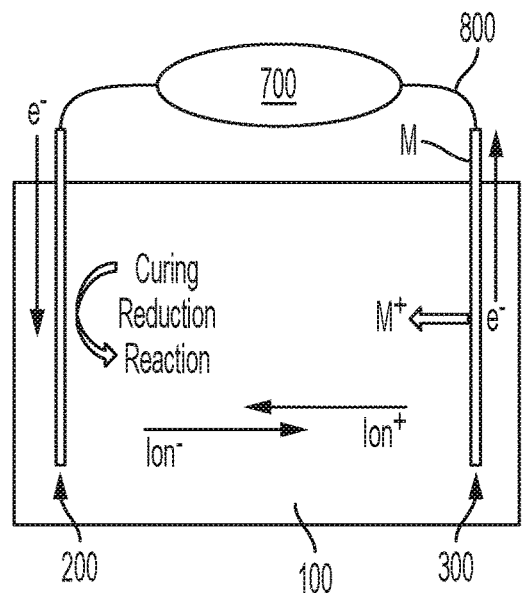

FIGS. 5A and 5B show an illustration of example where the cathode or anode participates directly in one of the half-reactions: (FIG. 5A) the cathode itself providing part of the reduction half-reaction and (FIG. 5B) oxidation of the anode subsequently deposits metal ions into the mixture as a product of the oxidation half-reaction.

Figure 6:
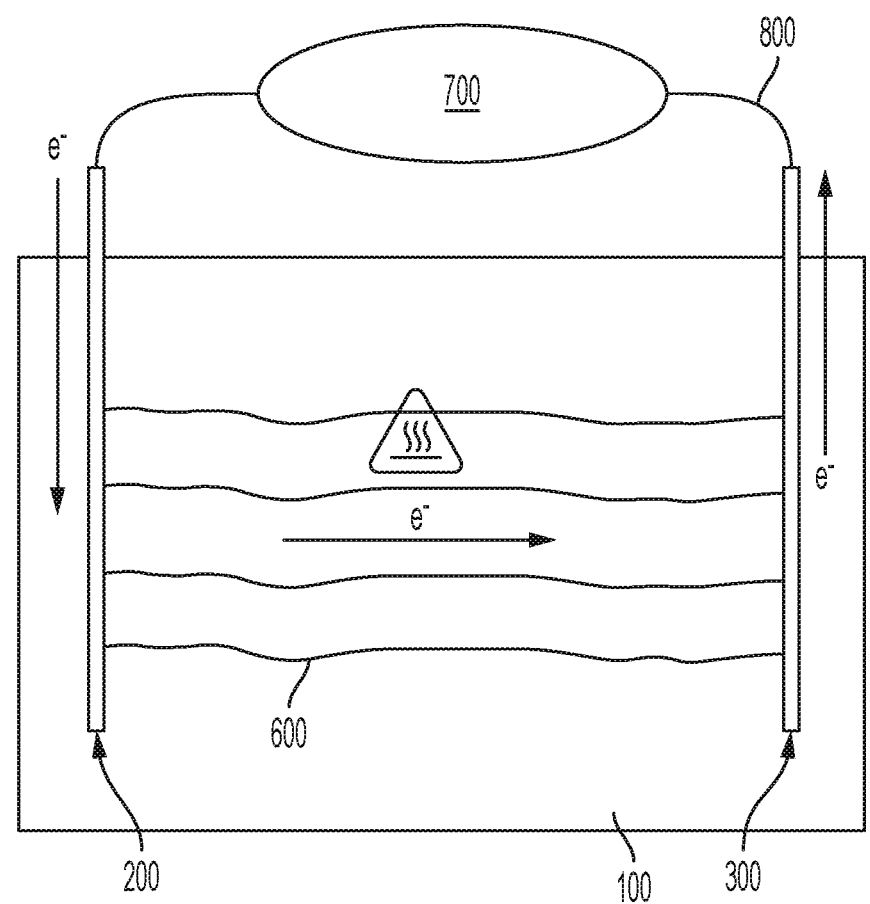

FIG. 6 presents an illustration of an example where the cathode and the anode are intentionally short-circuited. Hence, these electrodes will not support a redox reaction, but will facilitate the cure via resistive heating.

Figure 7:
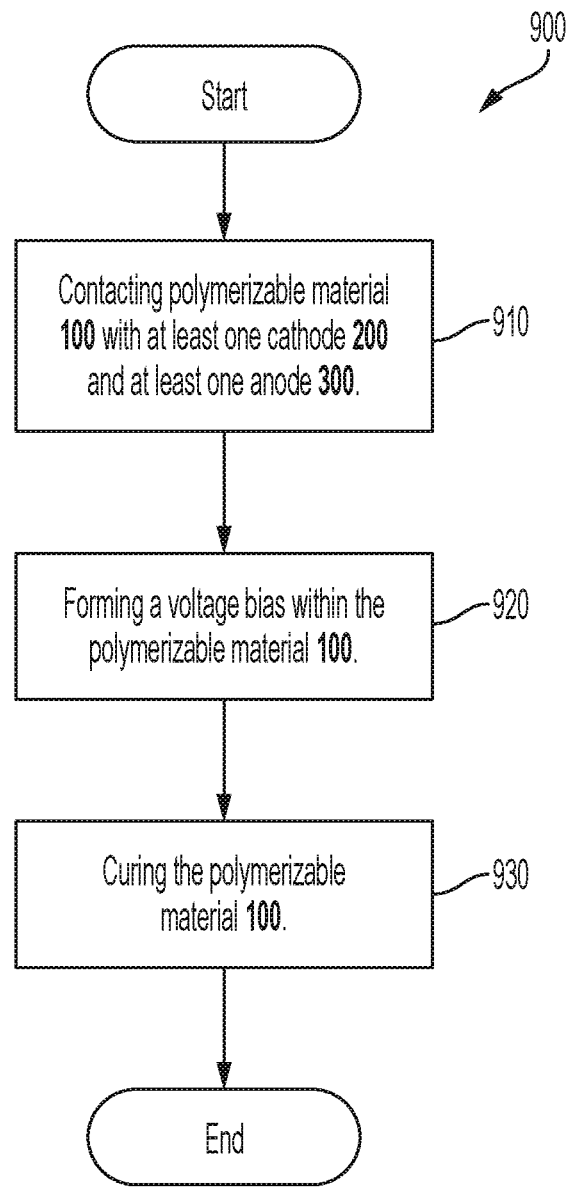

FIG. 7 is a schematic representation of an exemplary example of curing a polymerizable material via an electrochemical method.

In the figures, relative sizes as shown are arbitrary and are not meant to convey preferred dimensions or sizes.

Accordingly, it is to be understood that the examples of the disclosure herein described are merely illustrative of the application of the principles of the disclosure. Reference herein to details of the illustrated examples is not intended to limit the scope of the claims, which themselves recite those features regarded as essential to the disclosure.

DESCRIPTION

Disclosed are electrochemical methods and apparatuses for curing polymerizable materials 100 (including sealants such as polysulfide sealants) that use electrochemical methods through application of a voltage bias between electrodes at the surface or in the bulk of uncured polymerizable material. With polymerizable materials 100 that cure through a reductive reaction, the curing begins at the cathode 200 with a complementary reaction initially taking place at the anode 300. For polymerizable materials 100 that cure through an oxidative reaction, curing begins at the anode 300 with a complementary reaction initially taking place at the cathode 200. Some polymerizable materials 100 include one or more of various catalysts, oxidizing agents and reducing agents to promote curing.

Polysulfide sealants are one example of a polymerizable material 100 and are cured through reaction of polysulfide precursors with thiol reactive end groups and their oxidation with various catalysts and oxidizing agents ($MnO_2$, $ZnO_2$, chromates, and the like) compounded into a sealant mixture. The oxidation-reduction reaction (i.e., curing) then proceeds directly between the precursors at a kinetically limited rate. The curing of the sealant begins at the anode 300, whereas the complementary reduction reaction initially takes place at the cathode 200. In some examples, the anode 300 is in the form of a conductive probe placed into the bulk or on the surface of the sealant. Alternately, in other examples, the anode 300 is placed in a high surface area mesh in the bulk or on the surface of the uncured sealant. In certain examples, various additives, such as mobile electrolytes, are included in the sealant mixture or applied to the surface of the sealant in order to enhance the electrochemical curing process. The cathode 200 is placed either inside the bulk of the sealant or in an adjacent medium in electrical contact with the polymerizable material 100 and capable of carrying out the half-cell reduction reaction.

For curing reactions that occur through a reductive process, the cathode 200 is in the form of a conductive probe placed into the bulk or on the surface of the polymerizable material 100. In some examples, various catalysts and reducing agents are compounded with the polymerizable material 100. Alternately, the cathode 200 is placed in a high surface area mesh in the bulk or on the surface of the uncured polymerizable material. In certain examples, various additives, particularly mobile electrolytes, are included in the polymerizable material 100 or applied to the surface in order to enhance the electrochemical curing process. In these examples, the anode 300 is placed either inside the bulk of the polymerizable material 100 or in an adjacent medium in electrical contact with the polymerizable material 100 and capable of carrying out the half-cell reduction reaction.

Some sealants described herein have a peel strength of about 10 to about 60 pounds per linear inch as measured by SAE International test method AS5127/1. Other sealants have a peel strength of about 20 to about 50 pounds per linear inch as measured by SAE International test method AS5127/1.

In certain examples, the sealant has a shear strength of about 100 to about 600 pounds per square inch as measured by SAE International test method AS5127/1. Other sealants have a shear strength of about 100 to about 300 pounds per square inch as measured by SAE International test method AS5127/1.

Certain sealants have a specific gravity of about 1.0 to about 1.5 as measured by SAE International test method AS5127/1.

Some polymerizable materials 100 additionally comprise one or more conductive fillers. Suitable conductive fillers comprise electroconductive carbon black, nickel, zinc, silver, and combinations thereof.

The instant methods and apparatuses apply electrochemical potential to impact the thermodynamics and kinetics of the curing mechanism. Previous disclosures have applied electrochemistry to sealants in order to convert inert precursors into reactive reagents. There has been no known consideration of using an applied electrochemical potential to affect the kinetics of reactive agents.

The methods, apparatuses and systems disclosed herein have numerous advantages, including:
elimination of the need for having a heterogeneous or homogeneous mixture of the oxidizing agent and reducing agents within the polymerizable material 100;
the presence of an electric field facilitates the transport of electrons through the polymerizable material 100, increasing the cure rate;
the electrochemical curing method can be used to control the induction, or scorch, period of the polymerizable material 100 without adding other chemicals;
overcoming the limitation that the interior of polymerizable materials 100 can cure more slowly than the exterior; and
if the cure is self-catalyzing, the rate of cure will be highly dependent on the local extent of cure in the polymerizable material 100, the instant methods and apparatuses enable use of a large surface area electrode to quickly build up a high extent of cure over a large area.

The disclosure herein also allows making one-part sealant compositions with long shelf-life. The shelf-life advantage can be accomplished by formulating sealants that remain stable prior to the electrodes forming a voltage bias.

Furthermore, the apparatuses and methods enable the expedient repair of a small area in production and in the field. This is advantageous for applications where curing is desired on a localized area that is itself sensitive to heat, or has a nearby part that is sensitive to heat.

Current commercial aerospace vehicles use sealants in various places including but not limited to the fuselage and fuel tanks. For example, fuel is stored in both the wings and a center tank in between the wings. These integral fuel tanks do not rely on bladders or liners to hold the fuel, but rather the metallic or composite skin of the vehicle. As a result, joints and bolts must be properly sealed to (1) eliminate fuel leakage (2) mitigate corrosion potential and (3) protect against arcing electrical discharge within the fuel tank in the event of a lightning strike to the vehicle. Polysulfide sealants are the barrier material of choice in the aerospace industry for this application due to their fuel resistance, rheological properties, and cure profile.

In many cases, installation of polysulfide sealant material around a bolt or joint in an integral fuel tank involves the first step of applying a thin layer of primer or adhesion promoter material around the perimeter of the bolt to the sealed. Such a layer typically contains polysulfide material itself along with adhesion promoters to better mediate a bond between the substrate (Aluminum (Al) or carbon fiber-reinforced plastic (CFRP)) and bulk polysulfide material. The thin primer layer is often referred to as the "Class A" form of polysulfide sealant and the time required for its curing is many hours to days leading to delays in process efficiency and increased overall aircraft manufacture time.

Proper cure of the Class A material is necessary to move to the next step in the process. In some examples, the next step comprises obtaining a procured polysulfide cap designed to fit over a bolt and filling the cap with viscous uncured "Class B" polysulfide resin. This Class B material is viscous and requires a finite shear stress to move the material (Bingham fluid) allowing it to resist slumping under its own weight but is easily extruded through a dispensing gun. Upon curing of the Class A primer layer, a procured polysulfide cap is filled with Class B resin and pressed over the bolt and Class A primer location to extrude excess material for the edge. This excess is then removed and the bulk Class B material left to cure before being inspected.

The cure time required for Class A material represents a significant portion of the overall process time required for installation of a cap seal in an integral fuel tank. A significant improvement in the time associated with the initial primer step for polysulfide sealant installation around bolts would be a significant advantage. The currently disclosed methods represent an improvement over current state of the art in polysulfide sealant installation by reducing the time required for curing and, more generally, by offering better control of the overall cure kinetics. Importantly, the disclosed methods and apparatuses can be implemented with little or no changes in the chemical composition of the sealant, thereby preserving to a great extent the integrity of the sealant's physical properties after curing. Furthermore, the general principles embodied by the disclosed methods and apparatuses are suitable to cure any type of sealant, adhesive, and/or polymer whose curing mechanism is either an oxidation or reduction reaction. For simplicity, one focus of the disclosure describes methods and apparatuses as they apply to polysulfide sealants, whose curing mechanism is an oxidation reaction. However, the methods and apparatuses are suitable to be applied to other curing of polymerizable materials 100 including oxidation reaction sealants as well as reduction reaction sealants.

As discussed above, with polysulfide sealants the curing mechanism relies on the oxidation, or removal of electrons, of one component and the reduction, or gain of electrons, in another component. In order for this reaction to be successful, the oxidation and reduction reactions must be coupled. In other words, the oxidation process is an unfavorable reaction by itself. However, the oxidation process becomes energetically favorable when it is able to give electrons to a neighboring redox-active component. In the absence of electrical conduits, the component to be reduced and the component to be oxidized must be in close physical proximity, necessitating high concentrations of the two components in the polymerizable material 100 and requiring thorough mixing. Even still, the kinetics of the redox reaction are limited due to the fact that the components will not be perfectly dispersed—not every molecule that should be oxidized will be adjacent to an oxidizing agent, precluding the possibility of that molecule contributing to the overall extent of cure of the polymerizable material 100. Likewise, the reduction process is an unfavorable reaction by itself. However, the reduction process becomes energetically favorable when it is able to take electrons from a neighboring redox-active component.

In an electrochemical method or apparatus, at least two electrodes are placed in media such that at least one electrode (cathode 200) supports reduction reactions while at least one other electrode (anode 300) supports oxidation reactions. In certain examples, the media is the polymerizable material 100 alone. In other examples, the media comprise the polymerizable material 100 as well as one or more additional media that are in electrical contact the polymerizable material 100. As the half-reactions proceed, electrons flow from the anode 300 to the cathode 200. In some examples, in order to sustain the electron current, mobile ions are present in the media to prevent charge buildup. Thus, in an electrochemical cell the flow of electrons during a redox reaction is mediated by the electrodes (and their electrical connections) instead of electron transfer taking place directly between physically proximate reducing and oxidizing agents. In certain examples, the rate of electrochemical cure will be limited by the internal resistance of the polymerizable material 100, which is a result of both electrical and ionic resistance. In these examples, it is preferable to maintain a close separation distance between the anode 300 and cathode 200, e.g., several centimeters or less.

Using an electrochemical approach to facilitate the cure has several advantages compared to traditional curing methods. These advantages include the following. First, electrochemical approaches remove the requirement of having the oxidizing agent and reducing agent in physically close proximity. Because the anode 300 and cathode 200 are electrically connected, the oxidation half-reaction gives electrons to the anode 300. The reduction half-reaction then proceeds from the cathode 200 since it is able to receive electrons through the electrical wiring. Thus, the oxidizing and reducing components of the polymerizable material 100 can be physically far apart so long as an electrical connection is maintained between the components.

Second, the presence of an electric field facilitates the transport of electrons through the polymerizable material 100. Because the two half-reactions are separated macroscopically, electrolytically generated concentration gradients drive the diffusion of charge in the polymerizable material 100. The electric fields and concentration gradients make it energetically favorable for electrons to hop between redox sites (electron self-exchange), such that a redox center does not have to be immediately adjacent to an electrode in order for electron transfer to occur. This phenomenon is also referred to as redox conduction where the anode 300 is able to pull electrons toward itself, thereby creating redox conduits through the reducing material. Alternately, with other redox reactions, the cathode 200 is able to push electrons away from itself, thereby creating redox conduits through the oxidizing material. This phenomenon essentially extends the surface area of the electrode. This is one advantage of the disclosed methods and apparatuses, because the electric field in the polymerizable material 100 is used to drive not only the curing reaction itself, but also the propagation of charge. Control of the electric field enables control of the conductivity magnitude, thereby offering a precise method to control the cure rate. In the absence of electrodes, redox events take place only between physically close oxidizing and reducing agents, precluding the possibility of generating macroscopic concentration and electric field gradients. In the absence of electrodes, substantial energetic barriers to the redox reaction exist, which act to slow the kinetics of the cure. The energy barriers arise from intrinsic thermodynamic considerations and/or the separation distance between the oxidizing and reducing agents. Some polymerizable materials 100 comprise chemical additives which serve to reduce such energetic barriers. In the present methods and apparatuses, the electric field is used to overcome the energetic barriers.

Third, the electrochemical curing method is used to control the induction, or scorch, period of the polymerizable material 100. Many curing reactions of a polymerizable material 100 are spontaneous, i.e., no external energy is used to activate the cure. This can be disadvantageous, because a user of the polymerizable material 100 might not want the polymerizable material 100 to cure immediately after mixing. In some circumstances it is beneficial for the cure to begin slowly, allowing the user to apply the polymerizable material 100 in the desired location before the substance becomes stiff and difficult to work with. After the material is in the desired location, the polymerizable material 100 would ideally then begin to rapidly cure, so that the overall cure time does not become overly burdensome. This has been achieved, with only marginal success, through chemical means and tuning the rates and duration of these different cure periods is very difficult. It is usually done by controlling the kinetics of the reaction, i.e., the reaction is energetically favorable—it is just kinetically limited in the beginning. With the instant electrochemical methods, the curing mechanism of the polymerizable material 100 itself can be energetically unfavorable, meaning the mixed polymerizable material 100 would have a nearly infinite induction period. Upon applying an electrochemical potential, the targeted curing mechanism becomes energetically favorable, and the cure is instantly turned on or off by removing the electrochemical potential.

Fourth, some types of polymerizable materials 100 cure fastest on the outside, and then the cure propagates slowly through the bulk and eventually into the middle of the substance. There are also polymerizable materials 100 that are self-catalyzing. Thus, the rate of cure depends on the extent of cure, which takes time to build up to appreciable concentrations. Because curing with the instantly disclosed methods and apparatuses is fastest near the electrodes, curing in the bulk proceeds just as fast as at the surface with appropriately placed electrodes. Similarly, due to the potentially large surface area of the electrodes, electrochemical intervention can rapidly build up a high concentration of cured polymerizable material near the electrodes, enabling a self-catalyzing cure mechanism to then propagate the cure elsewhere quickly.

Fifth, the present methods and apparatuses enable the production of one-part polymerizable materials (such as sealants) with long shelf lives. Up to this point, the sealants have been two-part systems, where the reducing agent and oxidizing agent would be stored separately until the moment of application. This is because commercial sealants will spontaneously undergo curing when they come into direct contact. However, the oxidizing and reducing components can be designed so that the curing reaction is not spontaneous under ambient conditions. An applied electrochemical potential is used to overcome the energy barrier to such curing reaction. Therefore, a one-part sealant mixture containing both reducing and oxidizing species can be stable for long periods of time, and then cured on-demand through an applied potential.

In the following descriptions we will use polysulfide sealants as an example of the polymerizable material 100. However, the methods and apparatuses are suitable for any polymerizable material 100 whose curing mechanism depends on an oxidation-reduction chemical reaction. For those examples which contain an oxidizing agent, we have chosen to use $MnO_2$ as an example. Other suitable oxidizing agents include, but are not limited to, $ZnO_2$ and chromate-containing salts. Suitable chromate-containing salts include, but are not limited to, ammonium dichromate, potassium dichromate, potassium chromate, sodium chromate, and mixtures thereof.

Compositions will depend on the application and desired physical properties of the cured sealant. In some examples, the relative amounts of polysulfide and curing agent are: (1) Part A of the 2-part sealant includes the oxidizing agent in the range of about 20 to about 50% by weight and (2) Part B of the 2-part sealant includes the polymerizable material (polysulfide) which is in the range of about 20 to about 41% by weight. The two parts are mixed in a ratio of approximately 10:100 of Part A:Part B. In embodiments, the polymerizable material is a polysulfide sealant and a ratio of polysulfide sealant to oxidizing agent is about 3:1 to about 20:1. In certain examples, the final composition is about 18 to about 37% polymerizable material and about 2 to about 5% oxidizing agent, by weight of total solids. In other compositions, from about 0.1 to about 10.0% of electrolyte by weight of the total solids is used in the final composition. Some compositions have about 0.0 to about 10.0%, or a non-zero amount to about 10.0%, or a non-zero amount to about 5 weight percent by weight of total solids of electrically conductive filler in the medium with polymerizable material, and up to about 20% by weight of electrically conductive filler relative to the total solids in the medium hosting the complementary half-reaction are used in some reactions. There is generally a trade-off with adding electrolytes and conductive fillers: the more of these you add the better the cure, but the physical properties of the cured sealant will often suffer. When the two half reactions occur in different medium, the composition of the medium with polymerizable material mirrors that of the part B composition prior to mixing, and the composition of the medium with oxidizing agent mirrors the part A composition prior to mixing.

Oxidizing agents include, but are not limited to, $MnO_2$, $ZnO_2$, chromate salts, or the like, or some combination thereof.

The generalized half reactions that occur with polysulfide sealants are

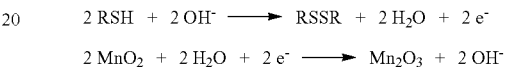

where R represents any combination of suitable atoms, most typically organic polymer chains or small molecules dominated by carbon and hydrogen atoms. In some examples, R represents a predominately aliphatic polymeric backbone of the thiol-containing species R-SH. The thiol content of typical polysulfides used in sealants is between about 1 and about 10%. The remainder of the polysulfide molecule is comprised of carbon, hydrogen, and oxygen, possibly with small amounts of other elements. Here, the oxidation of thiol groups into disulfide linkages, i.e., polymerization, is primarily responsible for creating the 3-dimensional network of bonded chemical structures which provides physical rigidity to the sealant. From these half-cell reactions and their potentials, the total cell potential is about +1.68 V, which implies that a spontaneous redox reaction will occur between these species in the directions indicated above. The present methods and apparatuses seek to facilitate this spontaneous reaction for faster curing.

One common sealant used in aircraft applications is liquid polysulfide. In one example, the general structure of the liquid polysulfide polymer is:

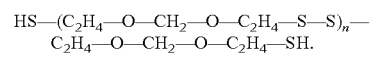

The value of n is a number in a range of 5 to 50, or 10 to 40 for some examples, controls polymer viscosity. Liquid polysulfide sealants typically use an oxidizing agent such as manganese dioxide ($MnO_2$) to promote curing.

Figure 1:
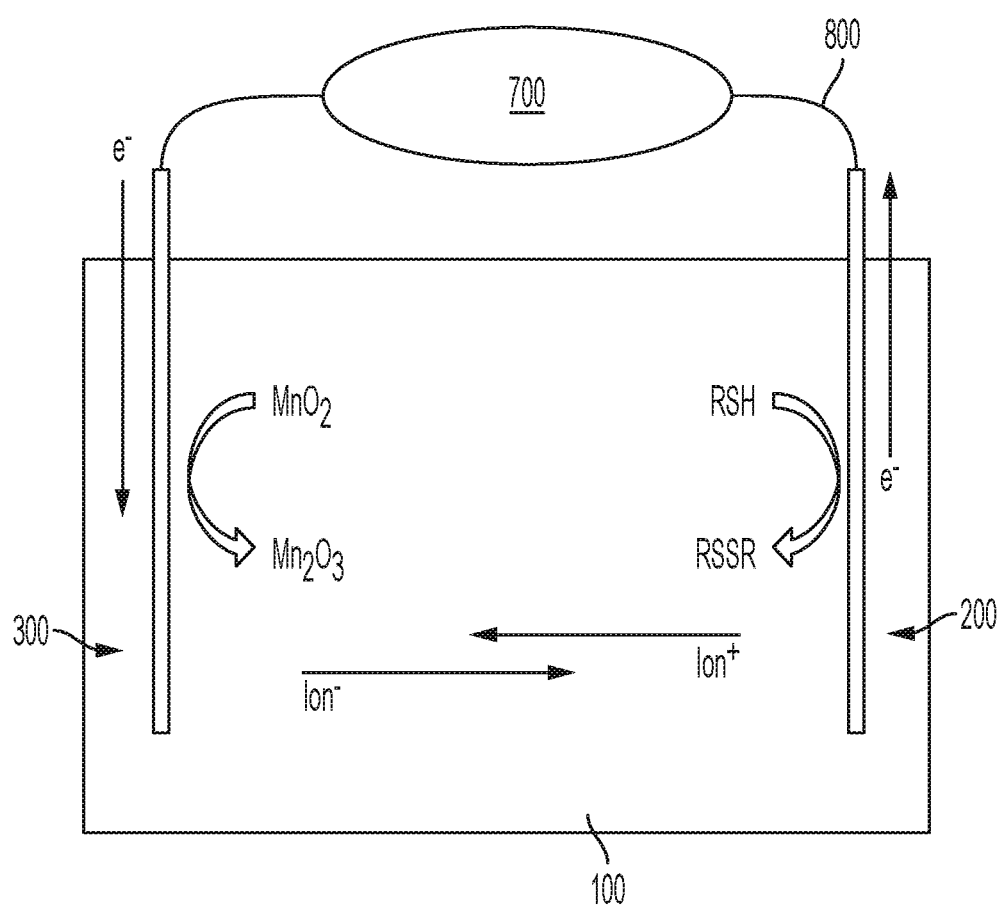
FIG. 1 shows a schematic representation of a system where an anode, supporting the oxidation reaction, and a cathode, supporting the reduction reaction, are both placed into/on the polymerizable material comprising an oxidizing agent ($MnO_2$) where polysulfide precursors are polymerized.

In the example of FIG. 1, a cathode 200 and an anode 300 are inserted directly into the sealant mixture. The cathode 200 and anode 300 are connected to a current/voltage source 700 by electric wiring 800. In certain examples, the oxidizing and reducing agents have a cell potential which is small enough, or even negative, such that a spontaneous reaction does not appreciably occur even when mixed. In such a case, the applied external potential makes the total cell potential positive, thereupon forcing the reaction to proceed. This is advantageous in that the sealant can be stored with a long shelf life without incurring significant curing. Thus, the sealant can be applied without the need for mixing prior to application.

In most polymerizable materials 100 there is a naturally occurring, but small number of mobile electrolytes present in the polymerizable material 100. Suitable polymerizable materials 100 includes those that contain chromate salts. Chromate salts are known to be good oxidizing agents, and facilitate the cure of the polymerizable material 100 through its reduction half-reaction. In addition, the chromate salt provides an intrinsic source of electrolytes to the polymerizable material 100, thereby facilitating the electrochemistry of the present methods and apparatuses. In the event the electrolyte concentration is too small to facilitate significant electrochemical curing, additional electrolytes can be added extrinsically to the polymerizable material 100 by including them in the initial formulation or by applying them to the surface of the polymerizable material 100 after it has been prepared. The electrolytes applied to the surface rely on diffusion in order to become dispersed in the polymerizable material 100. In certain examples, the electrolytes are in the form of organic or inorganic salts (or some combination thereof). Suitable salts include, but are not limited to, quaternary ammonium salts (for example, tetramethylammonium chloride, and tetrabutylammonium bromide), p-toluenesulfonates, perchlorates, and borates (for example, tetrabutylammonium tetrafluoroborate, and sodium tetraphenylborate). In some examples, the salts are first dissolved in water or another solvent (or some combination thereof) to facilitate mixing into the polymerizable material 100 and to promote ionic conductivity. In other examples, it is sufficient to add just a mobile phase (for example, water or organic solvent) to make existing electrolytes more mobile. Alternatively, the precursor(s) can have ionic pendant groups chemically bonded to their structure, providing an intrinsic source of mobile electrolytes.

When the polymerizable material comprises a mobile phase, suitable mobile phases include those that comprise water, an organic solvent, ammonia, or some combination thereof. Suitable organic solvents include allyl sulfide, 1-(p-tolyl)-3-methyl-5pyrazolone (PTMP), styrene, xylene, cyclohexane, liquid polysulfide, or the like, or mixtures thereof.

In some applications, it is desirable to eliminate the presence of electrolytes after the polymerizable material 100 is cured. If the cured polymerizable material 100 has sufficient porosity and left-over mobile phase, physically extracting the electrolytes can be achieved by application of a vacuum on the polymerizable material 100. The removal of the mobile phase alone significantly reduces the ionic conductivity of the polymerizable material 100, which is advantageous for some applications. Furthermore, in certain applications where the solvent content of the cured material must be tightly controlled, it is advantageous to include water absorbing species in the initial mixture such as, for example, calcium carbonate, aluminosilicates, magnesium silicates, some other zeolite, or more generally any mineral capable of forming a hydrate. Alternatively, a salt is initially chosen such that its degradation, i.e., the neutralization of charges, is promoted through the application of heat and/or light. Alkyl quaternary ammonium salts, for example, are known to degrade at elevated temperatures. Finally, degradation of the salt can be promoted through the application of an electrochemical potential. Some quaternary ammonium salts are known to degrade via electrolysis. In order to be effective, the potential required to degrade the salt should be larger in magnitude than the voltage required to accelerate the cure of the polymerizable material 100, without being so large that it degrades the cured polymerizable material 100 itself.

Figure 2:
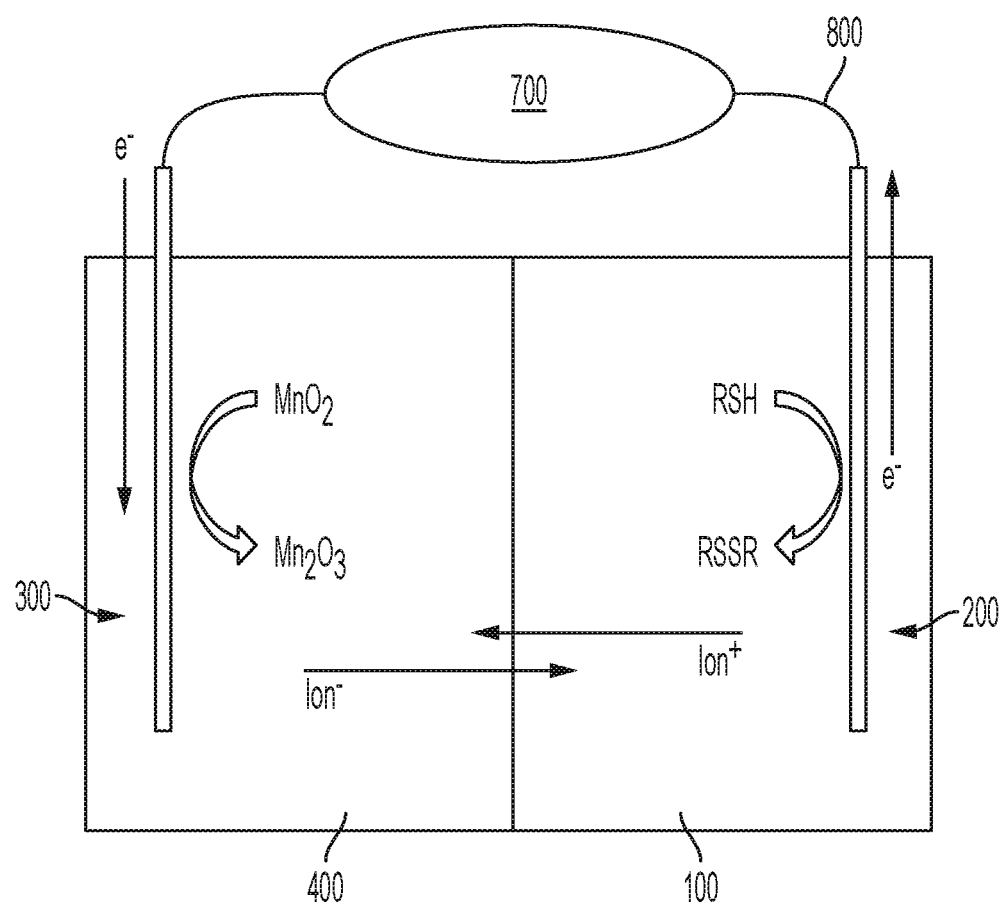
FIG. 2 shows one example where one electrode contacts the polymerizable material to be cured (polysulfide precursor) and the other electrode is in a different medium which hosts the complementary redox reaction ($MnO_2 \rightarrow MnO_3$) and is in electrical contact with the polymerizable material.

In another example, exemplified in FIG. 2, the components containing the oxidizing and reducing agents are not intimately mixed. With the example of polysulfide sealants, but without limiting the scope to sealants whose curing mechanism is primarily oxidative, the mechanism of cure is an oxidation reaction proceeding at the anode 300. In this example, the cathode 200 is placed into (or at least touching) a medium containing the component to undergo the complementary reduction reaction. The medium electrically contacts the polymerizable material. In some examples, the medium in contact with the cathode 200 contains one or more oxidizing agents, mobile electrolytes, and/or electrically conductive conduits (e.g., dispersed microparticles and/or fibers with good electrical conductivity). Furthermore, these two components, medium comprising the oxidizing agent 400 and polymerizable material 100, is physically connected through a medium that is ionically conductive, in order to maintain a charge balance during the electrochemical redox reaction. The media containing the oxidizing and reducing agents can themselves be ionically conductive. The medium hosting the oxidizing agent can be a liquid, semisolid (for example, a paste), or solid. The medium can additionally comprise an electrically conductive material. Likewise, a medium hosting a reducing agent can be a liquid, semisolid (for example, a paste), or solid and can additionally comprise an electrically conductive material.

Figure 3:
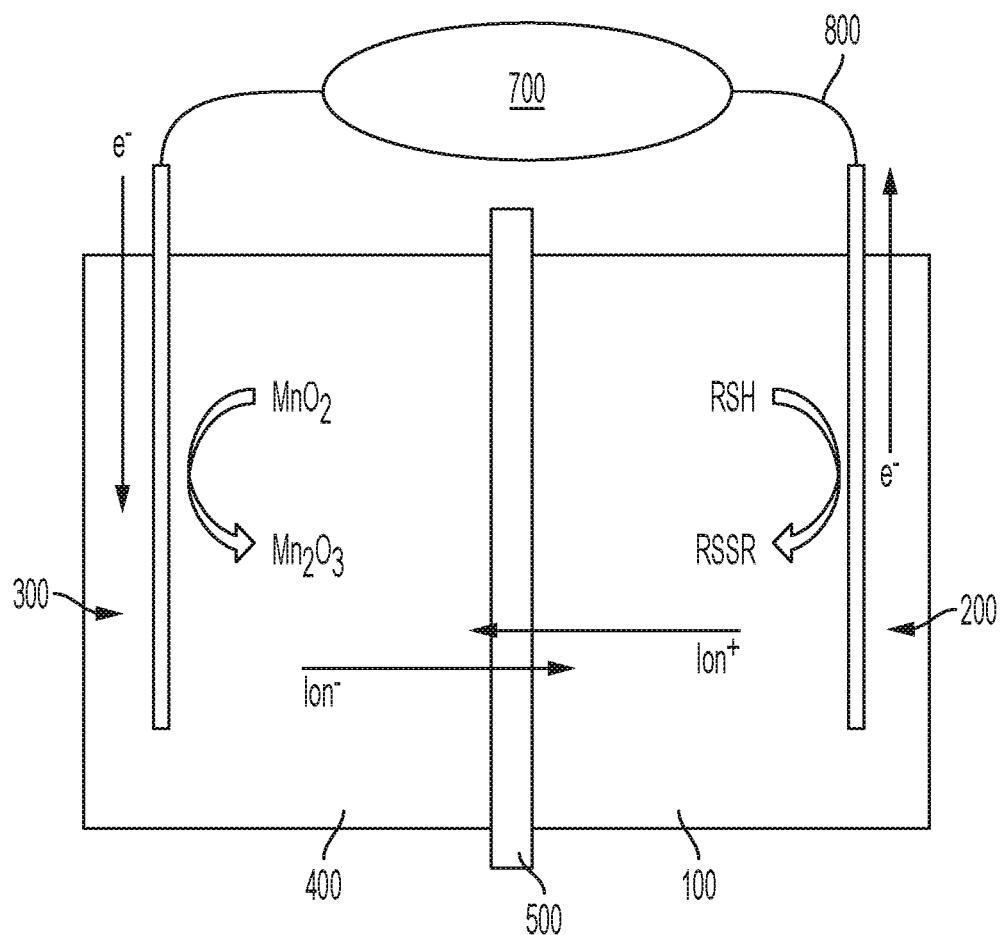
FIG. 3 is a schematic representation of an example where the oxidation reaction of the polymerizable material occurs in a separate medium from the reduction reaction. The complementary half-reactions occurring in the polymerizable material and the separate medium are physically separated by a porous membrane where electrolytes are able to travel through the porous membrane.

In FIG. 3, an ionically conductive medium is placed between the media containing the oxidizing and reducing agents and the polymerizable material 100. For example, a porous membrane 500, moist cloth, conductive mesh, or moist membrane can be placed between the polymerizable material 100 and the media comprising the oxidizing agent 400 in order to support the flow of electrolytes, but making it easy to physically remove the medium comprising the oxidizing agent 400 after the cure. In certain examples, the medium containing the component to be oxidized, i.e., cured, also contains oxidizing agents. These oxidizing agents can be those used in the separate medium supporting the reduction half reaction, or the separate medium can contain different oxidizing agents, or some combination thereof. Because reduction will occur only at the cathode 200, it is not of significant consequence if oxidizing agents are also present near the anode 300. This affords flexibility because a two-component sealant can be mixed and applied in the usual manner, and then an additional medium containing an oxidizing agent can be applied to the surface of the sealant. In these examples, the cathode 200 is applied to the additional medium, whereas the anode 300 would be applied to the sealant mixture itself. In some examples, even after electrochemical curing, the sealant mixture continues to naturally cure due to the presence of the oxidizing agent in the sealant mixture.

Many varieties of electrodes are compatible with the present methods and apparatuses. Several electrode designs useful in the instant methods and apparatuses are discussed below. In selecting an electrode, one consideration is the chemical compatibility of the electrodes. In some examples, the electrode itself does not undergo any oxidation or reduction reactions itself. Electrode materials include, but are not limited to, those that comprise tungsten, aluminum, glassy carbon, or platinum. The electrodes themselves can be comprised of a single element or a mixture of elements. Furthermore, the anode 300 and cathode 200 can comprise the same material or different materials. In some examples, the electrodes comprise a single cylindrical rod or take the form of another geometry, such as a flat plate. The anode 300 and cathode 200 comprise the same or different geometries. The anode 300 or the cathode 200 or both, hereafter referred to simply as electrodes, have one point of penetration into or contact with the polymerizable material 100, or many points of penetration or contact, as exemplified in FIG. 4A. The electrodes may have both penetration points of contact and surface points of contact. Some electrodes comprise a mesh grid, which increases the surface area of the electrodes relative to their overall volume. A mesh grid configuration is useful for minimizing the intrusiveness of the electrodes in/on the polymerizable material 100. In some examples, the electrodes comprise a fabric-like conductive material. Some electrodes are designed such that they are removed from the polymerizable material 100 after curing.

In other examples, the electrodes are sacrificial electrodes that are designed to remain in the polymerizable material 100 after curing, without significant loss of component functionality. The sacrificial electrodes can be chosen so that they confer desirable mechanical properties to the cured polymerizable material 100. In other examples, instead of inserting the electrodes into the polymerizable material 100 as illustrated by FIG. 4A, the electrodes are placed on the surface of the polymerizable material 100, as exemplified in FIGS. 4B and 4C. Such electrode configurations include a sandwich-like geometry, with electrodes on opposing sides of the polymerizable material 100, a parallel geometry on the same side of the polymerizable material 100 in order to cure primarily the surface, or an interdigitated geometry on the same side of the polymerizable material 100, again to promote the cure primarily on the surface.

In FIG. 5A and FIG. 5B, the electrode is chosen so that it intentionally partakes in either the reduction or oxidation half-reaction. In the example of polysulfide sealants, the primary curing half-reaction takes place at the anode 300, oxidizing thiols into disulfide linkages. Rather than using another component which is blended in the medium supporting the reduction half-reaction, such that the cathode 200 only serves to collect and transport electrons, the cathode 200 itself can provide part of the reduction half-reaction, as exemplified in FIG. 5A. In some examples, this configuration requires the extrinsic addition of the complementary metal ion to the mixture in which the cathode 200 is placed so that the reduction reaction occurs. However, one can choose an electrode material for which its complementary ions are already present in the aforementioned mixture. For polymerizable materials 100 whose curing mechanism is reductive, i.e., takes place at the cathode 200, metal ions do not need to be extrinsically added to the mixture hosting the oxidation half-reaction. In these methods, oxidation of the anode 300 will subsequently deposit metal ions into the mixture as a product of the oxidation half-reaction, as exemplified in FIG. 5B.

In some examples, the surface(s) (or some part thereof) to be sealed or bonded can be used as the electrode(s). For example, one or more of the faying surfaces in a joint to be sealed can be used as the electrode(s). In certain examples, a porous, non-electrically conductive material separates the electrodes in order to prevent short-circuiting.

An optional reference electrode can also be used with the disclosed methods and apparatuses in addition to cathode 200 and anode 300.

In some examples, a component is added to the polymerizable material 100 in order to provide additional electrical conduits. Electroconductive carbon black is one example of such a component.

In certain examples, electrochemical curing is applied through application of a direct current or voltage. Alternately, electrochemical curing is applied through application of alternating current and voltage source. Power can be supplied from an ordinary wall outlet, or through a battery-operated device (handheld or fixed). For polymerizable materials 100 with practically irreversible curing mechanisms, an alternating current or voltage source is preferred to a direct current/voltage source. Using an alternating current/voltage essentially switches the identity of the anode 300 and the cathode 200. Thus, the cure would be facilitated from both electrodes in an alternating fashion, depending on the sign of the voltage.

In the event that the electrodes are sufficiently resistive, and/or the polymerizable material 100 is sufficiently resistive, significant heating can occur in the polymerizable material 100. Most polymerizable materials 100 benefit from faster cure rates at elevated temperature. Thus, applying a potential between electrodes in a polymerizable materials 100 can result in curing benefits which do not exclusively derive from electrochemical considerations. In FIG. 6, a resistive wire 600, or multiple wires, are intentionally placed between the anode 300 and the cathode 200 in order to promote local heating in the polymerizable materials 100, thereby speeding up the cure. This example can be used successfully with polymerizable materials 100 (including sealants and adhesives) which do not rely on an oxidation-reduction reaction for the curing mechanism.

FIG. 7 presents a schematic representation of an exemplary example of method 900 for curing a polymerizable material 100. In process block 910, the polymerizable material 100 is contacted with at least one cathode 200 and at least one anode 300. The at least one cathode 200 and at least one anode 300 form a voltage bias within the polymerizable material 100 in process block 920. Process block 930 illustrates the curing the polymerizable material 100.

The disclosure also includes robotic apparatuses that employ the methods and/or apparatuses disclosed herein. One example of a robotic apparatus comprises at least one cathode; at least one anode; polymerizable material capable of cure through a redox reaction; a robotic arm for delivering the polymerizable material 100 to a desired location; and a tool for contacting the at least one cathode 200 and the at least one anode 300 with the polymerizable material 100 at the desired location. The robotic apparatus is used to control the positioning and curing of the polymerizable material 100. One way to deliver the polymerizable material 100 to the desired location is using a nozzle that is controlled by the robotic apparatus. In some examples, the robotic arm for delivering the polymerizable material to a desired location comprises (a) a reservoir for holding the polymerizable material and (b) at least one nozzle for delivering the polymerizable material to the desired location. The robotic apparatus is capable of providing electrodes and current to cure the polymerizable material 100. Robotic apparatuses may directly be controlled by a person or via a computer.

Throughout the specification, the disclosure is often discussed in terms of a sealant. It is understood that these disclosures apply equally to other polymerizable materials 100 that benefit from the application of an applied voltage bias. Such polymerizable materials 100 include those that cure via oxidative or reductive reactions.

The phrase "by weight" refers to percent by weight relative to the total weight of the solids.

The phrase "polymerizable material" refers to monomers, oligomers, or mixtures thereof that are capable of forming polymerizable material.

The term "sealant" refers to a substance capable of blocking passage of fluids through the surface or joints or openings in a material.

The term "cathode" refers to an electrode of an electrochemical cell at which a reduction reaction occurs.

The term "anode" refers to an electrode of an electrochemical cell at which an oxidation reaction occurs.

The term "voltage bias" refers to a particular voltage needed to perform a given operation. For example, in the instant apparatuses and methods, a voltage bias is produced by the anode 300 and the cathode 200 in the polymerizable material 100.

The phrase "scorch period" refers to the time that the polymerizable material can be held at a given temperature before curing begins.

Class A sealant is a low viscosity sealant that is pourable and has a viscosity of about 50 Poise to about 500 Poise.

Class B sealant is a high viscosity sealant that is a non-flowing sealant having a viscosity between about 9,000 Poise and about 20,000 Poise.

A "Bingham fluid" is a viscous fluid that possesses a yield strength that must be exceeded (i.e., sufficient stress applied) before the fluid will flow.

As used herein, the term "about", in the context of amounts expressed herein, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

When values are expressed as approximations, by use of the antecedent "about," it will be understood that the particular value forms another example. All ranges are inclusive and combinable.

Further, the disclosure comprises additional notes and examples as detailed below.

Clause 1. An apparatus for electrochemical curing of a polymerizable material comprising:
a polymerizable material capable of cure through a redox reaction;
at least one cathode; and
at least one anode;
wherein the at least one cathode and the at least one anode are positioned to be in electrical contact with the polymerizable material and the at least one cathode and the at least one anode are capable of forming a voltage bias within the polymerizable material that promotes curing of the polymerizable material; and
wherein the at least one anode and the at least one cathode contact the polymerizable material without physically contacting each other.

Clause 2. The apparatus of clause 1, wherein the polymerizable material is a sealant.

Clause 3. The apparatus of clause 1, wherein the polymerizable material is a polysulfide sealant.

Clause 4. The apparatus of any one of clauses 1-3, wherein the polymerizable material additionally comprises an oxidizing agent.

Clause 5. The apparatus of clause 4, wherein the oxidizing agent comprises $MnO_2$, $ZnO_2$, chromate salts, or some combination thereof.

Clause 6. The apparatus of any one of clauses 1-5, wherein the polymerizable material additionally comprises a conductive filler comprising one or more of electroconductive carbon black, nickel, zinc, and silver.

Clause 7. The apparatus of clause 5, wherein a ratio of polymerizable material to oxidizing agent is about 3:1 to about 20:1.

Clause 8. The apparatus of any one of clauses 2-7, wherein the cured sealant has a peel strength of about 30 to about 50 pounds per linear inch after curing as measured by SAE International test method AS5127/1.

Clause 9. The apparatus of any one of clauses 2-8, wherein the sealant has a shear strength of about 100 to about 600 pounds per square inch after curing as measured by SAE International test method AS5127/1.

Clause 10. The apparatus of any one of clauses 2-9, wherein the sealant has a specific gravity of about 1.0 to about 1.5 as measured by SAE International test method AS5127/1.

Clause 11. The apparatus of any one of clauses 1-10, additionally comprising one or more conductive fillers.

Clause 12. The apparatus of clause 11, wherein the conductive filler comprises one or more of electroconductive carbon black, nickel, zinc, and silver.

Clause 13. The apparatus of any one of clauses 1-3, wherein the polymerizable material additionally comprises a reducing agent.

Clause 14. The apparatus of any one of clauses 1-13, wherein both the at least one anode and the at least one cathode are embedded in the polymerizable material.

Clause 15. The apparatus of any one of clauses 1-13, wherein the at least one anode or the at least one cathode is placed in a first medium that is different from the polymerizable material; and wherein said medium electrically contacts the polymerizable material.

Clause 16. The apparatus of clause 15, wherein the first medium is separated from the polymerizable material by a conductive mesh.

Clause 17. The apparatus of clause 14 or clause 15, wherein the first medium is a paste comprising (a) an electrolyte and (b) an oxidizing agent or a reducing agent.

Clause 18. The apparatus of any one of clauses 15-17, where the at least one anode is placed in the first medium and the at least one cathode is placed in a second medium contacting the polymerizable material, wherein the second medium is different from the polymerizable material and electrically contacts the polymerizable material.

Clause 19. The apparatus of clause 18, wherein the second medium does not physically contact the first medium.

Clause 20. The apparatus of clause 18 or clause 19, wherein one or both of the first medium and second medium are removed after curing.

Clause 21. The apparatus of any one of clauses 1-20, wherein the apparatus additionally comprises a reference electrode.

Clause 22. The apparatus of any one of clauses 18-21, wherein the second medium comprises a porous material.

Clause 23. The apparatus of any one of clauses 1-22, wherein the polymerizable material comprises a mobile phase.

Clause 24. The apparatus of clause 23, wherein the mobile phase comprises water, an organic solvent, ammonia, or some combination thereof.

Clause 25. The apparatus of clause 24, wherein the organic solvent is allyl sulfide, 1-(p-tolyl)-3-methyl-5pyrazolone (PTMP), styrene, xylene, cyclohexane, or liquid polysulfide.

Clause 26. A method of curing a polymerizable material capable of cure through a redox reaction, the method comprising electrically contacting the polymerizable material with at least one anode and at least one cathode to create a voltage bias that promotes curing of the polymerizable material.

Clause 27. The method of clause 26, wherein the polymerizable material is a sealant.

Clause 28. The method of clause 26 or clause 27, wherein the sealant has a peel strength of about 30 to about 50 pounds per linear inch after curing as measured by SAE International test method AS5127/1.

Clause 29. The method of any one of clauses 26-28, wherein the sealant has a shear strength of about 100 to about 600 pounds per square after curing inch as measured by SAE International test method AS5127/1.

Clause 30. The method of any one of clauses 26-29, wherein the sealant has a specific gravity of about 1.0 to about 1.5 as measured by SAE International test method AS5127/1.

Clause 31. The method of any one of clauses 26-30, additionally comprising one or more conductive fillers.

Clause 32. The method of clause 31, wherein the conductive filler comprises one or more of electroconductive carbon black, nickel, zinc, and silver.

Clause 33. The method of any one of clauses 27-32, wherein the sealant has a cure time of 4 to 24 hr.

Clause 34. The method of any one of clauses 26-33, wherein the polymerizable material is a polysulfide sealant.

Clause 35. The method of any one of clauses 26-34, wherein the polymerizable material additionally comprises an oxidizing agent.

Clause 36. The method of clause 35, wherein a ratio of polymerizable material to oxidizing agent is about 3:1 to about 20:1.

Clause 37. The method of any one of clauses 26-34, wherein the polymerizable material additionally comprises a reducing agent.

Clause 38. The method of any one of clauses 26-37, wherein both the at least one anode and the at least one cathode are embedded in the polymerizable material.

Clause 39. The method of any one of clauses 26-37, wherein the at least one anode or the at least one cathode is placed in a first medium contacting but different from the polymerizable material.

Clause 40 The method of clause 39, wherein the first medium is a paste comprising electrolyte and either an oxidizing agent or a reducing agent.

Clause 41. The method of clause 40, wherein the first medium additionally comprises an electrically conductive material.

Clause 42. The method of any one of clauses 39-41, further comprising removing the first medium from contact with the polymerizable material after curing.

Clause 43. The method of any one of clauses 39-42, where the anode is placed in the first medium and the cathode is placed in a second medium contacting the polymerizable material, wherein the second medium is different from the polymerizable material and physically contacts the polymerizable material.

Clause 44. The method of clause 43, wherein the second medium does not physically contact the first medium.

Clause 45. The method of clause 43 or clause 44, wherein one or both of the first medium and second mediums are removed after curing.

Clause 46. The method of any one of clauses 26-45, polymerizable material comprises one or more conductive filler.

Clause 47. The method of any one of clauses 26-66, wherein the polymerizable material comprises a mobile phase.

Clause 48. The method of clause 47, wherein the mobile phase comprises water, an organic solvent, ammonia, or some combination thereof.

Clause 49. The method of clause 48, wherein the organic solvent is allyl sulfide, 1-(p-tolyl)-3-methyl-5pyrazolone (PTMP), styrene, xylene, cyclohexane, or liquid polysulfide.

Clause 50. The method of any one of clauses 26-49, wherein the polymerizable material is self-catalyzing.

Clause 51. The method of clauses 26-50, wherein one or more wires electrically connect the anode and the cathode.

Clause 52. A method curing a sealant comprising (a) positioning a polymerizable material in a desired location, (b) contacting the polymerizable material with at least one cathode and at least one anode; (c) forming a voltage bias within the polymerizable material, and (d) curing the polymerizable material.

Clause 53. A robotic apparatus employing the method of any one of clauses 26-51.

Clause 54. The robotic apparatus of clause 53, wherein the robotic apparatus comprises:
 at least one cathode;
 at least one anode;
 polymerizable material capable of cure through a redox reaction;
 a robotic arm for delivering the polymerizable material to a desired location; and
 a tool for contacting the at least one cathode and the at least one anode with the polymerizable material at the desired location.

Clause 55. The robotic apparatus of clause 54, wherein the robotic arm for delivering the polymerizable material to a desired location comprises (a) a reservoir for holding the polymerizable material and (b) at least one nozzle for delivering the polymerizable material to the desired location.

What is claimed:

1. An apparatus for electrochemical curing of a polymerizable material comprising:
 a polymerizable material capable of cure through a redox reaction;
 at least one cathode; and
 at least one anode;
  wherein the at least one cathode and the at least one anode are positioned to be in electrical contact with the polymerizable material and the at least one cathode and the at least one anode are capable of forming a voltage bias within the polymerizable material that promotes curing of the polymerizable material; and
  wherein the at least one anode and the at least one cathode contact the polymerizable material without physically contacting each other; and
  wherein the at least one anode or the at least one cathode is placed in a medium that is different from the polymerizable material; and wherein said medium that is different from the polymerizable material electrically contacts the polymerizable material.

2. The apparatus of claim 1, wherein the polymerizable material is a sealant.

3. The apparatus of claim 1, wherein the polymerizable material is a polysulfide sealant.

4. The apparatus of claim 1, wherein the polymerizable material additionally comprises an oxidizing agent.

5. The apparatus of claim 4, wherein the oxidizing agent comprises $MnO_2$, $ZnO_2$, chromate salts, or some combination thereof.

6. The apparatus of claim 5, wherein the polymerizable material is a polysulfide sealant and a ratio of polysulfide sealant to oxidizing agent is about 3:1 to about 20:1.

7. The apparatus of claim 1, wherein the polymerizable material additionally comprises a reducing agent.

8. The apparatus of claim 1, wherein the medium is a paste comprising (a) an electrolyte and (b) an oxidizing agent or a reducing agent.

9. The apparatus of claim 1, wherein the medium that is different from the polymerizable material is a first medium, and further comprising a second medium that is different from the polymerizable material and which electrically contacts the polymerizable material.

10. A method of curing a polymerizable material capable of cure through a redox reaction, the method comprising electrically contacting the polymerizable material with at least one anode and at least one cathode to create a voltage bias that promotes curing of the polymerizable material,
    wherein the at least one cathode and the at least one anode are positioned to be in electrical contact with the polymerizable material and the at least one cathode and the at least one anode are capable of forming a voltage bias within the polymerizable material that promotes curing of the polymerizable material; and
    wherein the at least one anode and the at least one cathode contact the polymerizable material without physically contacting each other; and
    wherein the at least one anode or the at least one cathode is placed in a medium that is different from the polymerizable material; and wherein said medium that is different from the polymerizable material electrically contacts the polymerizable material.

11. The method of claim 10, wherein the polymerizable material is a sealant.

12. The method of claim 10, wherein the sealant has a shear strength of about 100 to about 600 pounds per square inch after curing as measured by SAE International test method AS5127/1.

13. The method of claim 10, wherein the polymerizable material is a polysulfide sealant.

14. The method of claim 10, wherein the polymerizable material additionally comprises an oxidizing agent.

15. The method of claim 10, wherein the polymerizable material additionally comprises a reducing agent.

16. The method of claim 10, wherein the medium is a paste comprising (a) an electrolyte and (b) either an oxidizing agent or a reducing agent.

17. The method of claim 16, wherein the medium additionally comprises an electrically conductive material.

18. A robotic apparatus employing the method of claim 10, wherein the robotic apparatus comprises:
    at least one cathode;
    at least one anode;
    polymerizable material capable of cure through a redox reaction;
        a robotic arm for delivering the polymerizable material to a desired location; and
        a tool for contacting the at least one cathode and the at least one anode with the polymerizable material at the desired location,
        wherein the at least one cathode and the at least one anode are positioned to be in electrical contact with the polymerizable material and the at least one cathode and the at least one anode are capable of forming a voltage bias within the polymerizable material that promotes curing of the polymerizable material; and
        wherein the at least one anode and the at least one cathode contact the polymerizable material without physically contacting each other; and
    wherein the at least one anode or the at least one cathode is placed in a medium that is different from the polymerizable material; and wherein said medium that is different from the polymerizable material electrically contacts the polymerizable material.

* * * * *